United States Patent
Ahmed (12)

(10) Patent No.: US 7,373,151 B1
(45) Date of Patent: May 13, 2008

(54) DISTRIBUTED DYNAMIC CHANNEL ALLOCATION TECHNIQUE FOR MULTI-CARRIER CDMA CELLULAR SYSTEMS WITH MOBILE BASE STATIONS

(75) Inventor: Walid Ahmed, Eatontown, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/379,675

(22) Filed: Aug. 24, 1999

(51) Int. Cl.
*H04Q 7/20* (2006.01)

(52) U.S. Cl. .................................... 455/452.2; 455/453

(58) Field of Classification Search ................ 455/517, 455/512, 522, 509, 500, 515, 514, 450, 452, 455/453, 464, 452.2
See application file for complete search history.

(56) References Cited

U.S. PATENT DOCUMENTS

| | | | | |
|---|---|---|---|---|
| 4,144,412 A | * | 3/1979 | Ito et al. ...................... | 455/450 |
| 5,729,826 A | * | 3/1998 | Gavrilovich ................ | 455/11.1 |
| 5,903,843 A | * | 5/1999 | Suzuki et al. ............. | 455/452.2 |
| 6,026,277 A | * | 2/2000 | Gavrilovich ................ | 455/11.1 |
| 6,078,817 A | * | 6/2000 | Rahman ....................... | 455/452 |
| 6,112,092 A | * | 8/2000 | Benveniste .................. | 455/450 |
| 6,230,016 B1 | * | 5/2001 | Benveniste .................. | 455/450 |
| 6,243,575 B1 | * | 6/2001 | Ohyama et al. .......... | 455/456.4 |
| 6,246,883 B1 | * | 6/2001 | Lee ............................. | 455/507 |
| 6,317,598 B1 | * | 11/2001 | Wiesen et al. .............. | 455/443 |
| 6,463,286 B1 | * | 10/2002 | Salminen ..................... | 455/453 |
| 2004/0043764 A1 | * | 3/2004 | Bigham et al. ........... | 455/422.1 |

OTHER PUBLICATIONS

Katzela et al., "Channel Assignment Schemes for Cellular Mobile Telecommunication Systems: A Comprehensive Survey," IEEE Personal Communications (Jun. 1996).

* cited by examiner

*Primary Examiner*—William D. Cumming (57) ABSTRACT

A distributed dynamic channel allocation algorithm for a multi-carrier CDMA cellular system having at least one mobile base station. The distributed dynamic channel allocation algorithm uses channel power measurements from both the requesting mobile station and the mobile base station attempting to allocate an available resource to the mobile station. The distributed dynamic channel allocation algorithm attempts to allocate the best available resource for the requesting mobile station, in terms of interference, while minimizing the amount of interruption that the allocated resource may cause to existing connections in neighboring cells. Thus, the distributed dynamic channel allocation algorithm follows a "least-interference, least-interruption" strategy. The distributed dynamic channel allocation algorithm is load balancing, since it tends to assign new resources to mobile base station with lighter loads.

26 Claims, 10 Drawing Sheets

ACTUAL LOAD TABLE FOR $R_i$ (200)

| DOWNLINK | | UPLINK | |
|---|---|---|---|
| BAND | LOAD | BAND | LOAD |
| $B_1^D$ | $M_{1,i}^D$ | $B_1^U$ | $M_{1,i}^U$ |
| $B_2^D$ | $M_{2,i}^D$ | $B_2^U$ | $M_{2,i}^U$ |
| ⋮ | ⋮ | ⋮ | ⋮ |
| $B_L^D$ | $M_{L,i}^D$ | $B_L^U$ | $M_{L,i}^U$ |

FIG. 3

ACTUAL USER LIST FOR $R_i$ (300)

| MOBILE ID | DOWNLINK | | | | UPLINK | | | |
|---|---|---|---|---|---|---|---|---|
| | $B_1^D$ | $B_2^D$ | ... | $B_L^D$ | $B_1^U$ | $B_2^U$ | ... | $B_L^U$ |
| $M_1$ | $c_{1,1}^{i,D}$ | $c_{1,2}^{i,D}$ | ... | $c_{1,L}^{i,D}$ | $c_{1,1}^{i,U}$ | $c_{1,2}^{i,U}$ | ... | $c_{1,L}^{i,U}$ |
| $M_2$ | $c_{2,1}^{i,D}$ | $c_{2,2}^{i,D}$ | ... | $c_{2,L}^{i,D}$ | $c_{2,1}^{i,U}$ | $c_{2,2}^{i,U}$ | ... | $c_{2,L}^{i,U}$ |
| ⋮ | | | ... | | | | ... | |
| $M_K$ | $c_{K,1}^{i,D}$ | $c_{K,2}^{i,D}$ | ... | $c_{K,L}^{i,D}$ | $c_{K,1}^{i,U}$ | $c_{K,2}^{i,U}$ | ... | $c_{K,L}^{i,U}$ |

FIG. 4

| NOMINAL RESOURCE AVAILABILITY TABLE 400 FOR $R_i$ |||| 
|---|---|---|---|
| DOWNLINK || UPLINK ||
| BAND | AVAIL. | BAND | AVAIL. |
| $B_1^D$ | $a_{1,i}^{D,nom}$ | $B_1^U$ | $a_{1,i}^{U,nom}$ |
| $B_2^D$ | $a_{2,i}^{D,nom}$ | $B_2^U$ | $a_{2,i}^{U,nom}$ |
| $\vdots$ | $\vdots$ | $\vdots$ | $\vdots$ |
| $B_L^D$ | $a_{L,i}^{D,nom}$ | $B_L^U$ | $a_{L,i}^{U,nom}$ |

FIG. 5

| MEASURED RESOURCE AVAILABILITY TABLE 500 FOR $R_i$ ||||
|---|---|---|---|
| DOWNLINK || UPLINK ||
| BAND | AVAIL. | BAND | AVAIL. |
| $B_1^D$ | $a_{1,i}^{D,mrd}$ | $B_1^U$ | $a_{1,i}^{U,mrd}$ |
| $B_2^D$ | $a_{2,i}^{D,mrd}$ | $B_2^U$ | $a_{2,i}^{U,mrd}$ |
| $\vdots$ | $\vdots$ | $\vdots$ | $\vdots$ |
| $B_L^D$ | $a_{L,i}^{D,mrd}$ | $B_L^U$ | $a_{L,i}^{U,mrd}$ |

FIG. 6

| REALISTIC RESOURCE AVAILABILITY TABLE 600 FOR $R_i$ ||||
|---|---|---|---|
| DOWNLINK || UPLINK ||
| BAND | AVAIL. | BAND | AVAIL. |
| $B_1^D$ | $a_{1,i}^{D,real}$ | $B_1^U$ | $a_{1,i}^{U,real}$ |
| $B_2^D$ | $a_{2,i}^{D,real}$ | $B_2^U$ | $a_{2,i}^{U,real}$ |
| $\vdots$ | $\vdots$ | $\vdots$ | $\vdots$ |
| $B_L^D$ | $a_{L,i}^{D,real}$ | $B_L^U$ | $a_{L,i}^{U,real}$ |

FIG. 7

| RAP NEIGHBORHOOD RECEIVED POWER LIST 700 FOR $R_i$ ||
|---|---|
| RAP ID | RECEIVED POWER LEVEL |
| $R_{i1}$ | $P_{i \leftarrow 1}$ |
| $R_{i2}$ | $P_{i \leftarrow 2}$ |
| ⋮ | ⋮ |
| $R_{iJ}$ | $P_{i \leftarrow J}$ |

FIG. 8

| DEMAND LIST 800 FOR $R_I$ |||
|---|---|---|
| MOBILE ID | # OF REQUESTED RESOURCES | LOCATION IN QUEUE |
| $M_1$ | $\lambda_1^D, \lambda_1^U$ | $X_1$ |
| $M_2$ | $\lambda_2^D, \lambda_2^U$ | $X_2$ |
| ⋮ | ⋮ | ⋮ |
| $M_K$ | $\lambda_K^D, \lambda_K^U$ | $X_K$ |

FIG. 9

| PROBABILITY OF ASSIGNMENT TABLE 900 FOR $R_i$ ||||
|---|---|---|---|
| DOWNLINK || UPLINK ||
| BAND | AVAIL. | BAND | AVAIL. |
| $B_1^D$ | $p_{1,i}^D$ | $B_1^U$ | $p_{1,i}^U$ |
| $B_2^D$ | $p_{2,i}^D$ | $B_2^U$ | $p_{2,i}^U$ |
| ⋮ | ⋮ | ⋮ | ⋮ |
| $B_L^D$ | $p_{L,i}^D$ | $B_L^U$ | $p_{L,i}^U$ |

| MOBILE DOWNLINK INTERFERENCE MEASUREMENT TABLE 1100 ||
| BAND | MEASURED INTERFERENCE LEVEL |
| --- | --- |
| $B_1^D$ | $I_{1,k}^D$ |
| $B_2^D$ | $I_{2,k}^D$ |
| $\vdots$ | $\vdots$ |
| $B_L^D$ | $I_{L,k}^D$ |

FIG. 12

| PREPDICTED NEW LOAD TABLE 1200 FOR $R_i$ ||||
| DOWNLINK || UPLINK ||
| BAND | PREDICTED LOAD | BAND | PREDICTED LOAD |
| --- | --- | --- | --- |
| $B_1^D$ | $\mu_{1,i}^D$ | $B_1^U$ | $\mu_{1,i}^U$ |
| $B_2^D$ | $\mu_{2,i}^D$ | $B_2^U$ | $\mu_{2,i}^U$ |
| $\vdots$ | $\vdots$ | $\vdots$ | $\vdots$ |
| $B_L^D$ | $\mu_{L,i}^D$ | $B_L^U$ | $\mu_{L,i}^U$ |

FIG. 13

| RAP NEIGHBORHOOD PREDICTED LOAD AND AVAILABILITY LIST 1300 FOR $R_i$ | | |
|---|---|---|
| RAP ID | PREDICTED LOAD | REAL AVAILABILITY |
| $R_{i1}$ | $\mu^D_{l,i1}, \mu^U_{l,i1} \forall l$ | $a^{D,real}_{l,i1}, a^{U,real}_{l,i1} \forall l$ |
| $R_{i2}$ | $\mu^D_{l,i2}, \mu^U_{l,i2} \forall l$ | $a^{D,real}_{l,i2}, a^{U,real}_{l,i2} \forall l$ |
| ⋮ | ⋮ | ⋮ |
| $R_{iJ}$ | $\mu^D_{l,iJ}, \mu^U_{l,iJ} \forall l$ | $a^{D,real}_{l,iJ}, a^{U,real}_{l,iJ} \forall l$ |

FIG. 14

| CONSIDERATE RESOURCE AVAILABILITY TABLE 1400 FOR $R_i$ | | | |
|---|---|---|---|
| DOWNLINK | | UPLINK | |
| BAND | AVAIL. | BAND | AVAIL. |
| $B_1^D$ | $a^{D,con}_{1,i}$ | $B_1^U$ | $a^{U,con}_{1,i}$ |
| $B_2^D$ | $a^{D,con}_{2,i}$ | $B_2^U$ | $a^{U,con}_{2,i}$ |
| ⋮ | ⋮ | ⋮ | ⋮ |
| $B_L^D$ | $a^{D,con}_{L,i}$ | $B_L^U$ | $a^{U,con}_{L,i}$ |

FIG. 15

| PREDICTED RESOURCE AVAILABILITY TABLE 1500 FOR $R_i$ | | | |
|---|---|---|---|
| DOWNLINK | | UPLINK | |
| BAND | AVAIL. | BAND | AVAIL. |
| $B_1^D$ | $a^{D,pred}_{1,i}$ | $B_1^U$ | $a^{U,pred}_{1,i}$ |
| $B_2^D$ | $a^{D,pred}_{2,i}$ | $B_2^U$ | $a^{U,pred}_{2,i}$ |
| ⋮ | ⋮ | ⋮ | ⋮ |
| $B_L^D$ | $a^{D,pred}_{L,i}$ | $B_L^U$ | $a^{U,pred}_{L,i}$ |

| MOBILE-ESTIMATED RESOURCE AVAILABILITY TABLE 1700 FOR $R_i$ FOR $M_k$ | | | |
|---|---|---|---|
| DOWNLINK | | UPLINK | |
| BAND | AVAIL. | BAND | AVAIL. |
| $B_1^D$ | $a_{1,i}^{D,MobEst}$ | $B_1^U$ | $a_{1,i}^{U,MobEst}$ |
| $B_2^D$ | $a_{2,i}^{D,MobEst}$ | $B_2^U$ | $a_{2,i}^{U,MobEst}$ |
| ⋮ | ⋮ | ⋮ | ⋮ |
| $B_L^D$ | $a_{L,i}^{D,MobEst}$ | $B_L^U$ | $a_{L,i}^{U,MobEst}$ |

FIG. 18

| MOBILE TOTAL RESOURCE AVAILABILITY TABLE 1800 FOR $M_k$ | | | |
|---|---|---|---|
| DOWNLINK | | UPLINK | |
| RAP | AVAIL. | RAP | AVAIL. |
| $R_1$ | $a_i^{D,total}$ | $R_1$ | $a_i^{U,total}$ |
| $R_2$ | $a_i^{D,total}$ | $R_2$ | $a_i^{U,total}$ |
| ⋮ | ⋮ | ⋮ | ⋮ |
| $R_N$ | $a_i^{D,total}$ | $R_N$ | $a_i^{U,total}$ |

FIG. 19

DISTRIBUTED DYNAMIC CHANNEL ALLOCATION TECHNIQUE FOR MULTI-CARRIER CDMA CELLULAR SYSTEMS WITH MOBILE BASE STATIONS

FIELD OF THE INVENTION

The present invention relates to a multi-carrier CDMA cellular systems, and more particularly, to a distributed dynamic channel allocation algorithm for multi-carrier CDMA cellular systems with mobile base stations.

BACKGROUND OF THE INVENTION

Code division multiple access (CDMA) techniques transmit multiple information signals on the same channel (carrier frequency), and differentiate each user sub-channel by encoding it with a unique spreading code. CDMA techniques have been employed in many digital wireless communication systems to permit a large number of system users to communicate with one another. CDMA systems treat each user as a separate signal, while treating other users as either interference or noise. As the number of interfering users increases, the corresponding interferences add to cause degradation of performance, such as an increasing bit error rate (BET) or frame error rate.

Multi-carrier CDMA systems are employed for interference avoidance rather than interference averaging. Interference avoidance is more plausible when interfering terminals are likely to get close to each other frequently; a situation which arises in a highly dynamic network such as a cellular network with mobile base stations. In fact, the case of mobile base stations is typical for battlefield networks where a number of Radio Access Points (RAPs) serve as the base station and are deployed in the field to act as switching/routing nodes for traffic generated by mobile terminals in the vicinity of such RAPs. In a commercial setting, it has been proposed to deploy RAPs on trucks or public transportation vehicles, such as buses and the like.

While conventional channel allocation techniques are satisfactory for fixed or stationary base stations, the mobility of the base stations themselves degrades the performance of such conventional channel allocation techniques in the mobile environment of the present invention. Thus, a need exists for a distributed dynamic channel allocation algorithm for multi-carrier CDMA cellular systems having mobile base stations.

SUMMARY OF THE INVENTION

Generally, a distributed dynamic channel allocation algorithm is disclosed for a multi-carrier CDMA cellular system having at least one mobile base station. The disclosed distributed dynamic channel allocation algorithm is based on channel power measurements carried out by both the mobile station requesting an allocation of a resource and the mobile base station attempting to allocate an available resource to the mobile station. Channel power measurements from both the mobile base station and the requesting mobile station are used since the mobile base stations are not fixed base stations as is the case in commercial CDMA systems.

The distributed dynamic channel allocation algorithm attempts to allocate the best available resource for the requesting mobile station, in terms of interference, while minimizing the amount of interruption that the allocated resource may cause to existing connections in neighboring cells. Thus, the distributed dynamic channel allocation algorithm follows a "least-interference, least-interruption" strategy. The distributed dynamic channel allocation algorithm of the present invention is load balancing, since it tends to assign new resources to mobile base station with lighter loads. Due to the mobility of the mobile base station, a mobile base station can cause interference to mobiles connected to another close-by mobile base station. According to another aspect of the invention, the uplink and downlink channels are not paired and can be independently assigned to requesting mobile stations.

Dynamic channel allocation processes are provided to assign resources to a new mobile station, and to assign a new resource to an existing mobile station. The dynamic channel allocation process (new mobile) and dynamic channel allocation process (new resource for existing mobile) collect measurement information on network interference and load conditions, and assign a resource to a requesting mobile station in an optimum manner.

A more complete understanding of the present invention, as well as further features and advantages of the present invention, will be obtained by reference to the following detailed description and drawings.

DETAILED DESCRIPTION

Figure 1:
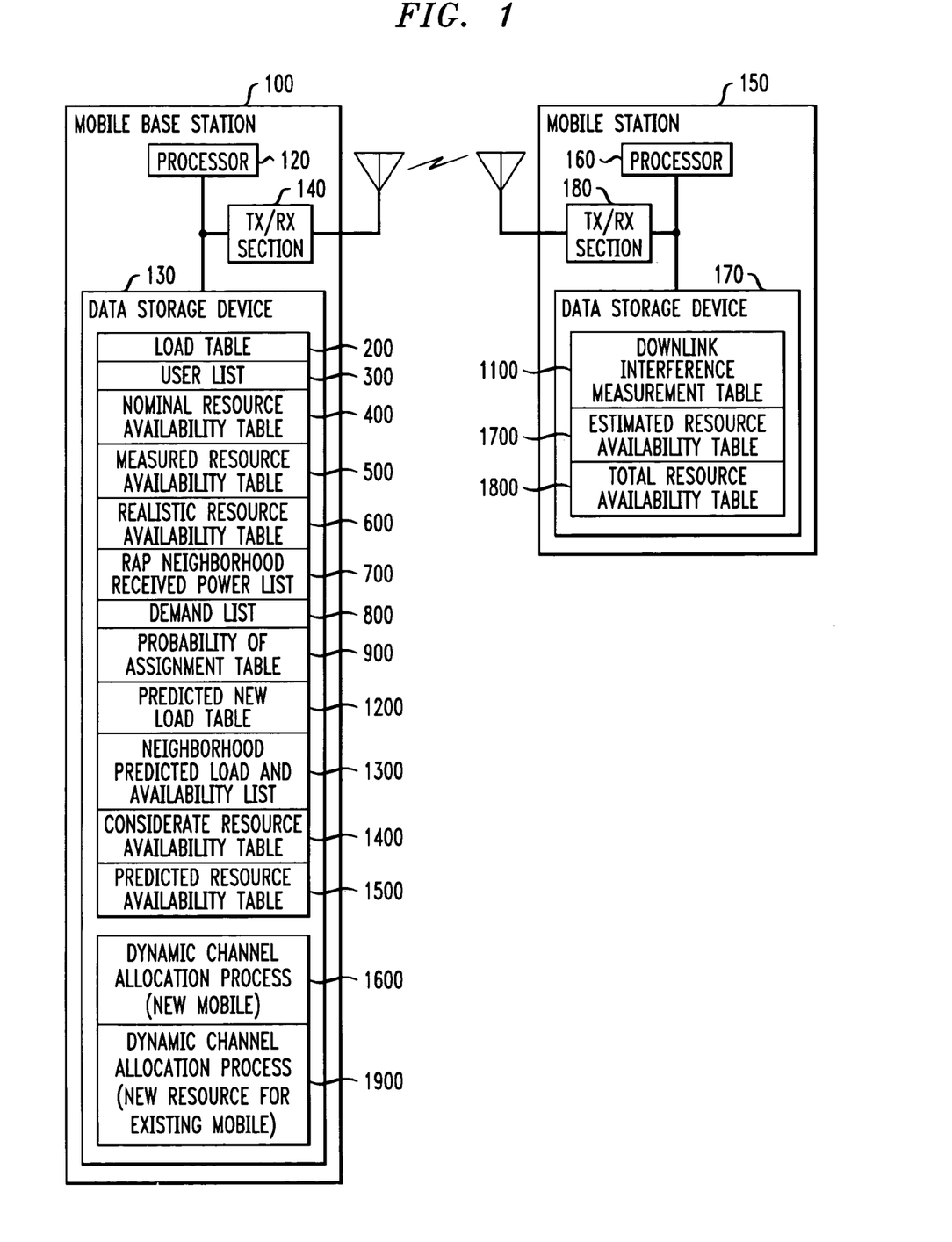
FIG. 1 illustrates a multi-carrier CDMA cellular system that includes a mobile base station and a mobile station in accordance with the present invention.

FIG. 1 illustrates a multi-carrier CDMA cellular system that includes a mobile base station 100 and a mobile station 150, in accordance with the present invention. According to one feature of the present invention, the distributed dynamic channel allocation algorithm is based on channel power measurements carried out by both the mobile station requesting an allocation of a resource and the mobile base station 100 attempting to allocate an available resource to the mobile station. Since the mobile stations play a role in obtaining a resource allocation, based on information they receive from the mobile base stations 100, the resource allocation is improved. A resource is defined as one PN code over one frequency band and is equal to one CDMA channel. Channel power measurements from both the mobile base station 100 and the requesting mobile station are used since the mobile base station 100 are not fixed base stations as is the case in commercial CDMA systems.

Generally, the distributed dynamic channel allocation algorithm tries to capture the best available resource for the requesting mobile station, in terms of interference, while minimizing the amount of interruption that the allocated resource may cause to existing connections in neighboring cells. Thus, according to a further feature of the present invention, the distributed dynamic channel allocation algorithm follows a "least-interference, least-interruption" strategy.

In view of the mobility of the mobile base station 100, a mobile base station 100 can cause interference to mobiles connected to another close-by mobile base station 100. Thus, information from the second mobile base station 100 only, based on its loading, will not be sufficiently accurate and real measurements from the mobile stations of the affected cell have to be collected and taken into consideration. The distributed dynamic channel allocation algorithm of the present invention is load balancing, since it tends to assign new resources to mobile base station 100 with lighter loads.

Multi-Carrier CDMA Mobile Base Station Terminology

In the vicinity of a mobile, there are N RAPs denoted $R_1$ to $R_N$. The forward, or downlink is divided into L CDMA frequency bands, denoted $B_1^D$ to $B_L^D$. The reverse, or uplink is divided into L CDMA frequency bands, denoted $B_1^U$ to $B_L^U$. According to another feature of the present invention, the uplink and downlink channels are not paired.

The mobile base stations 100 and mobile stations use a broadcast channel to announce their measurements, tables and decisions. The broadcast channel must be separate in frequency from traffic channels. Generally, a broadcast channel can be implemented by dedicating a small frequency band for such a purpose. The frequency band allocated for broadcast is then divided into a downlink portion and an uplink portion. The downlink portion is to be accessed by mobile base stations 100 and the uplink portion is to be accessed by mobile stations. Access to an uplink or downlink portion can be made through contention for PN codes or time slots.

The maximum amount of time that a mobile can wait before being allocated a resource is called the "wait period" and is equal to $T_{wait}$.

As shown in FIG. 1, each mobile base station 100 includes certain hardware components, such as a processor 120, a data storage device 130, and a transmit/receive section 140. The processor 120 can be linked to each of the other listed elements, either by means of a shared data bus, or dedicated connections, as shown in FIG. 1. The transmit/receive section 140 allows the mobile base station 100 to communicate with other mobile base stations 100 and mobile stations.

The data storage device 130 is operable to store one or more instructions, which the processor 120 is operable to retrieve, interpret and execute in accordance with the present invention. In addition, the data storage device 130 includes a number of tables, discussed hereinafter, that are used by the distributed dynamic channel allocation algorithm to allocate an appropriate resource to a requesting mobile station. Finally, the data storage device 130 includes a dynamic channel allocation process (new mobile) 1600 and a dynamic channel allocation process (new resource for existing mobile) 1900 discussed further below in conjunction with FIGS. 16 and 19, respectively. The manner in which each table is utilized in deriving a dynamic channel allocation will be discussed in conjunction with the flow charts of FIGS. 16 and 19.

Mobile Base Station Tables

Load Table

Figure 2:
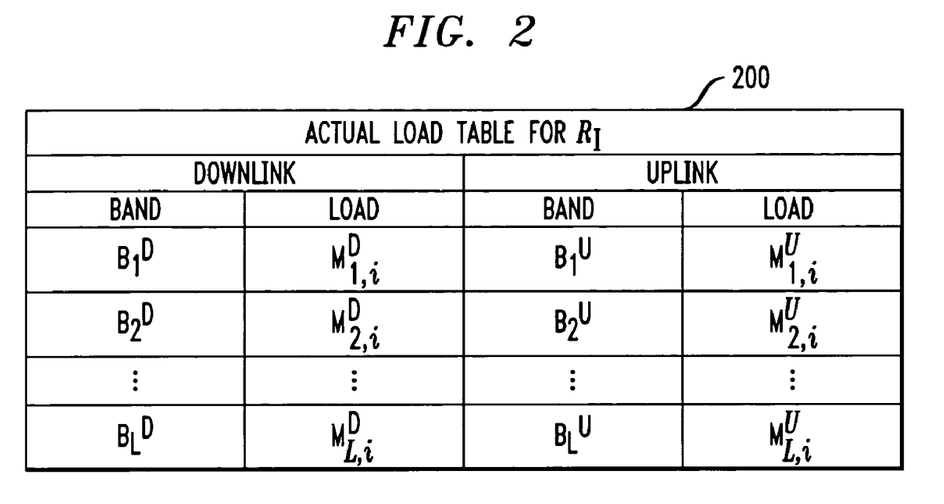
FIG. 2 is a sample table from an exemplary load table of FIG. 1.

A mobile base station $R_i$ forms, and continuously updates, a load table 200, shown in FIG. 2. It is noted that since a mobile base station 100 is also referred to as a Radio Access Point (RAP), a variable, R, is used to identify a mobile base station 100. The load table 200 records $m_{l,i}^D$, the number of resources received from $R_i$ over band l on the downlink and $m_{l,i}^U$, the number of resources transmitted to $R_i$ over band l on the uplink.

User List

Figure 3:
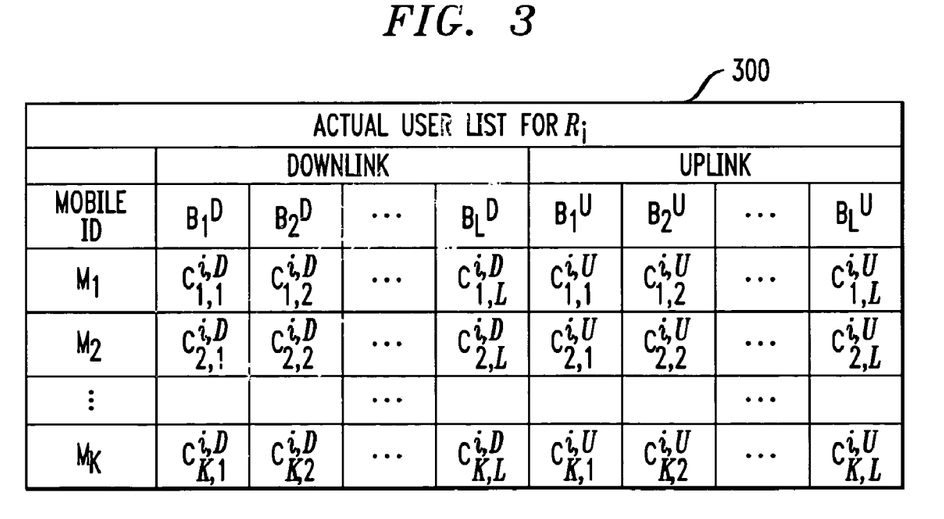
FIG. 3 is a sample table from an exemplary user list of FIG. 1.

A mobile base station, $R_i$, keeps track of its users by maintaining a user list 300, shown in FIG. 3. The user list 300 records, $C_{k,i}^{i,U}$, the set of PN codes used by mobile $M_k$ for transmission over $B_l^U$ for the mobile base station $R_i$, and $C_{k,i}^{i,D}$, the set of PN codes used by the mobile base station $R_i$ for transmission to mobile $M_k$ over band $B_l^D$. As discussed further below, a mobile station may use more than one code over a certain band, and also more than one band, in order to fulfil the rate requirements for the service in concern. It is noted that if a mobile station is using λ number of PN codes over a certain band, the mobile station is counted as λ users, for the corresponding band, when filling up the load table.

Nominal Capacity and Availability

Figure 4:
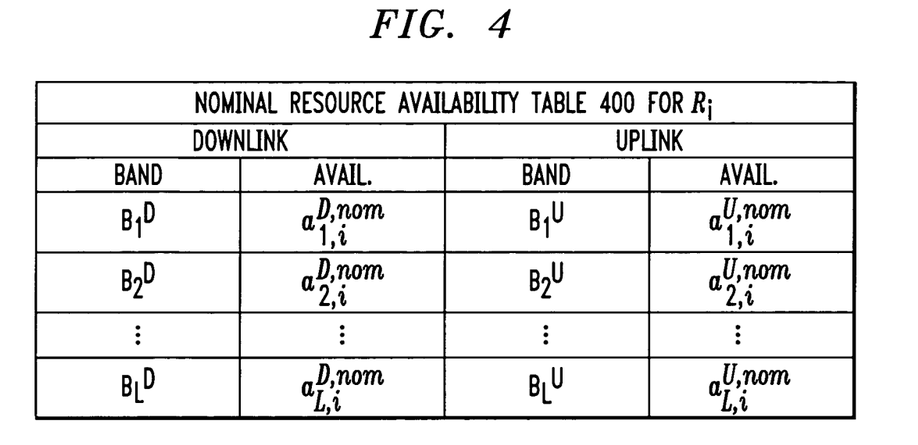
FIG. 4 is a sample table from an exemplary nominal resource availability table of FIG. 1.

Each RAP Ri assumes a nominal capacity, $CAP_{l,i}^U$ and $CAP_{l,i}^D$, for each band on uplink or downlink, respectively. The nominal capacity is usually determined prior to deployment of a mobile base station 100 as a result of simulations or field trials. In addition, a mobile base station $R_i$ forms and continuously updates a nominal resource availability table 400, shown in FIG. 4, where:

$$a_{l,i}^{D,nom} = CAP_{l,i}^D - m_{l,i}^D,$$

and $$a_{l,i}^{U,nom} = CAP_{l,i}^U - m_{l,i}^U.$$

Interference Measurements by Mobile Stations

Mobile stations connected to a mobile base station 100 periodically measure the downlink frequency bands and determine the amount of interference that exist on each band and send this information back to the mobile base station 100. These measurements do not necessarily require a separate channel for reporting to the mobile base station 100.

The measurements can be reported by embedding them in the data sent by the corresponding mobile stations on their uplink channels.

The details of mobile downlink measurements are as follows. A mobile station measures the amount of interference power on each downlink frequency band. The mobile station translates the interference power into maximum number of new resources that can be added to the band without degrading the channel for the mobile. The translation from interference power to maximum number of new resources can be implemented as follows. For example, let the minimum S/I be η, the received power by mobile station M for a resource in the band in concern by P, the measured interference power be I and the amount of interference power due to a new resource (assuming the mobile base station 100 is transmitting at maximum power/resource) be $\Delta_I$. Then, the maximum number of new resources determined by M for the band in concern is:

$$a \leq \min\left\{CAP, \left\lfloor \frac{\left(\frac{P}{\eta} - I\right)}{\Delta_I} \right\rfloor\right\},$$

where $\lfloor . \rfloor$ denotes the largest integer smaller than or equal to the enclosed quantity and CAP is the nominal capacity of the downlink band in concern.

Resource Availability Based on Reported Interference Measurements

Figure 5:
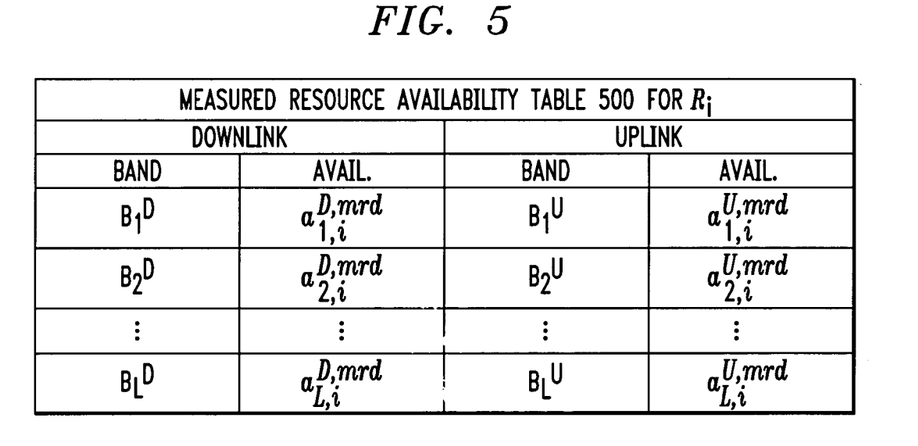
FIG. 5 is a sample table from an exemplary measured resource availability table of FIG. 1.

A mobile base station $R_i$ averages the measurements from the mobile stations to obtain a measured resource availability table 500, as shown in FIG. 5. The averaging procedure can be made such that mobile stations experiencing a bad channel may get larger weights, or stronger votes, as follows. For example, if the maximum number of new resources, or availability, determined by a mobile for a band is a, and let CAP be the nominal capacity for that band, then the modified availability is $a_{mod}$=4a if a≦CAP/4, $a_{mod}$=3a if CAP/4≦a≦CAP/2, $a_{mod}$=2a if CAP/2≦a≦3 CAP/4, and $a_{mod}$=a if 3 CAP/4≦a≦CAP.

Mobile base station $R_i$ also measures the interference on each uplink band and determines measured availability figures in similar way to the downlink procedure. Notice that the actual load on the mobile base station 100 may not reflect availability accurately if the mobile base station 100 is receiving interference from mobile stations close to it but they belong to an adjacent mobile base station 100. Thus, the mobile base station 100 should measure the uplink.

Figure 6:
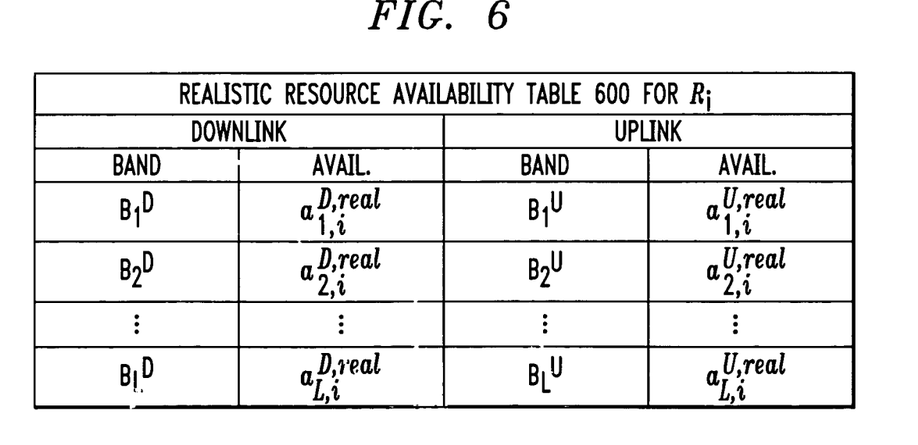
FIG. 6 is a sample table from an exemplary realistic resource availability table of FIG. 1.

In addition, a mobile base station $R_i$ forms a realistic resource availability table 600, shown in FIG. 6, based on the lower of the measured and nominal availability values, as follows:

$$a_{l,i}^{D,real} = \min\{a_{l,i}^{D,mrd}, a_{l,i}^{D,nom}\},$$

and $$a_{l,i}^{U,real} = \min\{a_{l,i}^{U,mrd}, a_{l,i}^{U,nom}\}$$

Neighboring Mobile Base Stations

Figure 7:
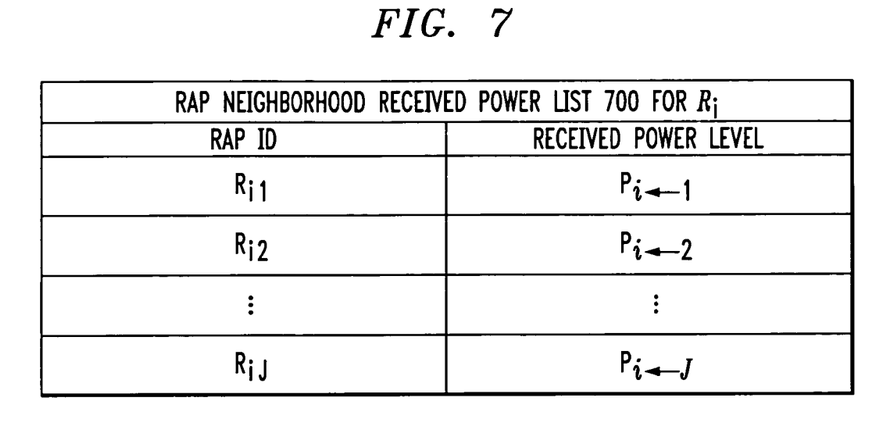
FIG. 7 is a sample table from an exemplary mobile base station (RAP) neighborhood received power list of FIG. 1.

A mobile base station $R_i$ keeps track of other mobile base stations 100 in the vicinity and their power levels. Thus, mobile base station $R_i$ forms and continuously updates a mobile base station (RAP) neighborhood received power list 700, shown in FIG. 7. The power levels $P_{i \leftarrow j}$ set forth in the RAP neighborhood received power list 700 are received on beacon channels.

Demand List

Each mobile base station $R_i$ forms a demand queue for the mobile stations requesting resources from that mobile base station 100. The mobile stations are lined up in the queue based on a first-come first-serve criterion. Such a criterion is easily implemented if it is assumed that a time-stamp is associated with each request. The demand queue size for $R_i$ will be denoted $Q_i^D$ and $Q_i^U$ for downlink and uplink, respectively. The queue size may be larger than the number of users lined up, since one user may request more than one resource per uplink or downlink. In other words, $Q_i$ is the total number of requested resources per direction rather than the total number of queued mobile stations.

Figure 8:
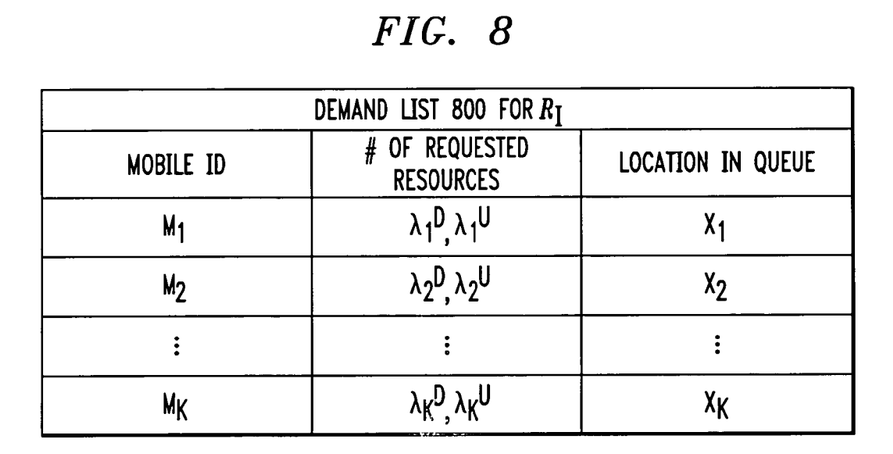
FIG. 8 is a sample table from an exemplary demand list of FIG. 1.

If the queue size is equal to some value $Qi_{max}^D$ or $Qi_{max}^U$, all new requests are rejected until the queue size is reduced by one. A mobile base station $R_i$ keeps track of the mobile stations lined up in the queue by maintaining a demand list 800, shown in FIG. 8.

Probability of Assignment Table

A mobile base station 100 keeps track of the statistics of each frequency band by computing the ratio between the number of resources successfully assigned to a band relative to the number of demands received by the mobile base station $R_i$. Thus, the mobile base station $R_i$ forms and continuously updates a probability of assignment table 900, shown in FIG. 9.

Figure 9:
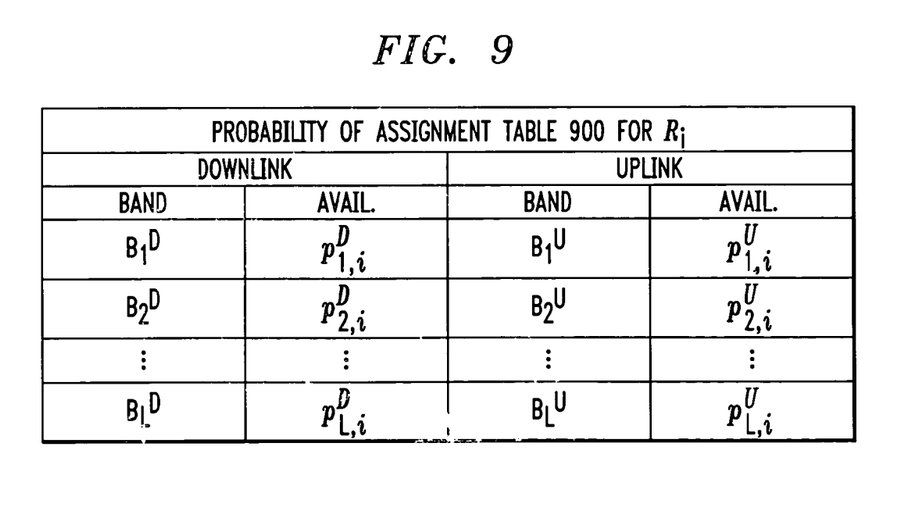
FIG. 9 is a sample table from an exemplary probability of assignment table of FIG. 1.
Figure 10:
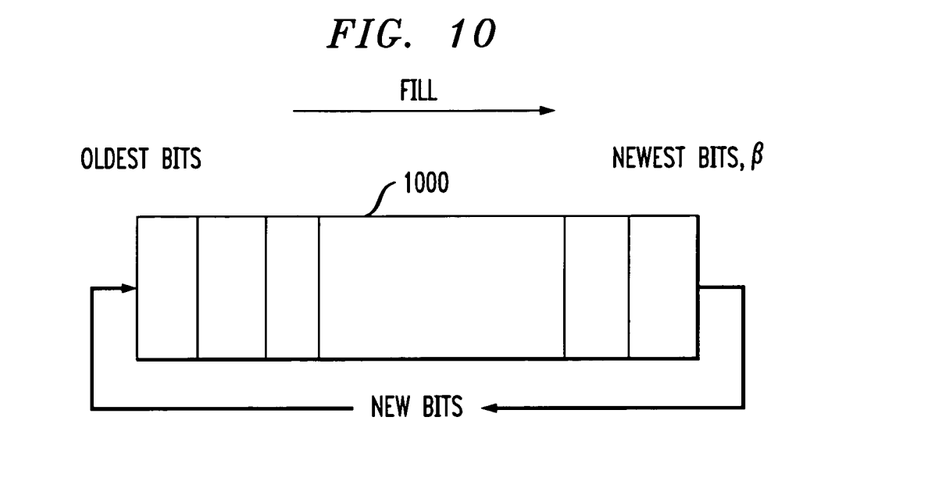
FIG. 10 illustrates circular buffers used by the mobile base station of FIG. 1.

The $p_{l,i}$ values set forth in FIG. 9 can be calculated such that old statistics are dropped off. In other words, the mobile base station 100 forgets the statistics collected some time T ago, to provide better results due to the high dynamism of the system, as old results may be misleading and not representative of current situations. To enable the mobile base station 100 to forget old data, L circular buffers 1000, shown in FIG. 10, are utilized. As shown in FIG. 10, each circular buffer 1000 has β number of bits, for example, 1000 or $2^{10}$ bits (128 bytes). Clearly, β is the memory length. Each bit has a value of 1 or 0, depending on whether the resource at the time corresponding to that bit has been granted. When the buffer is full, new bits overwrite old ones as shown in FIG. 10. A probability, $p_{l,i}$, is then easily computed by counting the number of ones and dividing by β.

Interference Measurement Table

When a new resource request is received by a mobile base station $R_i$ for a mobile $M_k$, the requesting mobile station informs $R_i$ with the interference measurements the mobile has collected regarding the downlink, in the manner described above. These measurements are in the form shown in FIG. 11.

Predicted Load Table

Figure 12:
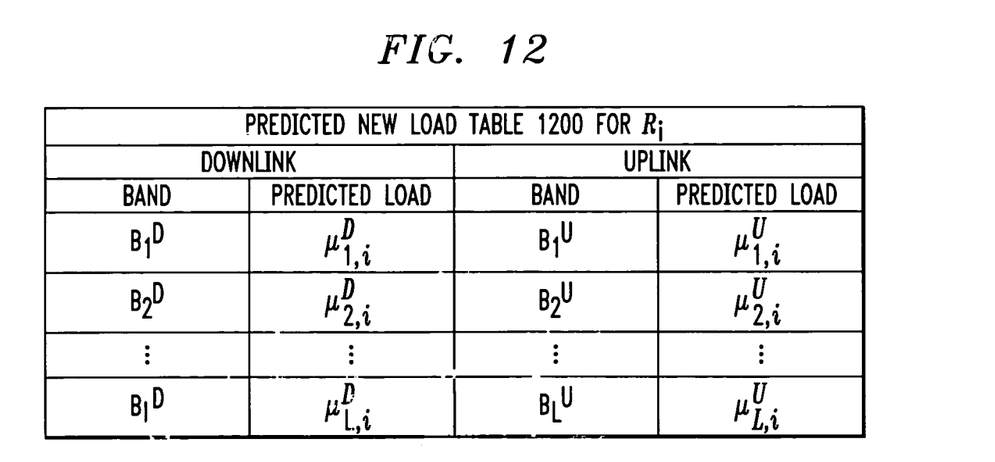
FIG. 12 is a sample table from an exemplary predicted new load table of FIG. 1.

A mobile base station $R_i$ forms a predicted new load table 1200, shown in FIG. 12, for next new mobile station that requests resources. In one implementation, a predicted new load $\mu_{l,i}^D$ is computed as follows:

$$\mu_{l,i}^D = p_{l,i}^D \sum_{k=1}^{K} \lambda_k^D.$$

In one implementation, a predicted new load $\mu_{l,i}^U$ is computed as follows:

$$\mu_{l,i}^U = p_{l,i}^U \sum_{k=1}^{K} \lambda_k^U.$$

Neighborhood Predicted Load and Availability List

Adjacent RAPs keep track of predicted loads of each other as well as their realistic availabilities over all bands. For example, mobile base station $R_i$ forms and continuously updates a neighborhood queue size list 1300, shown in FIG. 13.

Figure 13:
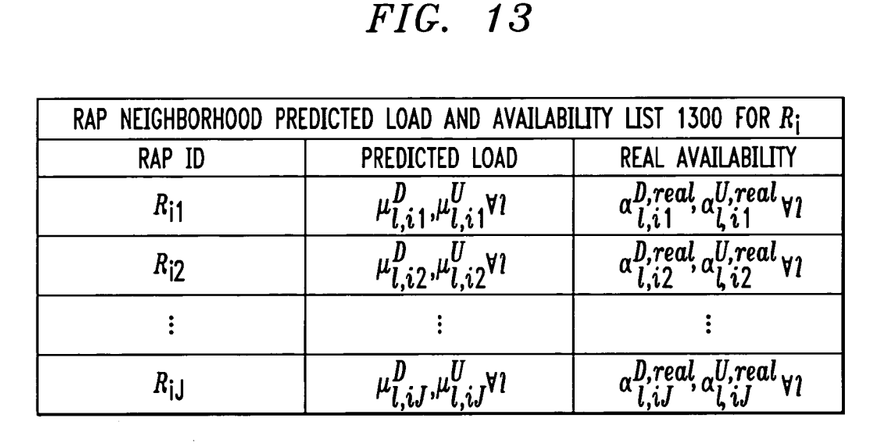
FIG. 13 is a sample table from an exemplary neighborhood queue size list of FIG. 1.

In order for mobile base station $R_i$ to limit the adjacent mobile base stations 100 from future interference with its existing load on the downlink, or receiving future interference from adjacent mobile base station 100 loads on the uplink, $R_i$ sends messages to all adjacent mobile base stations 100. The contents of these messages are availability estimates for the downlink/uplink bands based on the realistic availability table of $R_i$, the power level received at $R_j$ due to the corresponding adjacent mobile base station 100 and the queue size of $R_i$ relative to other adjacent mobile base stations 100 as well as $R_i$. The availability estimate sent by $R_i$ to $R_{ij}$ is calculated as follows: For band $B_L^D$ on downlink, let the realistic availability for $R_i$ be $\alpha_{l,i}^{D,real}$.

Then, an approximate availability estimate from $R_i$ to $R_{ij}$ can be expressed as follows:

$$a_{l,D}^{i\to ij} = \gamma^{-1} \left(\frac{P_{i\leftarrow ij}}{P_{max}}\right)^{-1} \left( \frac{a_{l,ij}^{D,real} - \mu_{l,ij}^D}{\sum_{j=1}^{J} a_{l,ij}^{D,real} - \mu_{l,ij}^D} \right) \cdot (a_{l,i}^{D,real} - \mu_{l,i}^D) \cdot \alpha_{l,i}^D,$$

where $\alpha_{l,i}^D$ is a number between zero (0) and one (1) that is chosen according to the value of $(\alpha_{l,j}^{D,real} - \mu_{l,j}^D)$. In other words, if (a−μ) is high, then α=1, and vice versa. It is noted that if $\alpha_{l,ij}^{D,real} - \mu_{l,ij}^{D,real}$ is negative, it is replaced by zero.

The quantity $P_{max}$ is the maximum total power transmitted by a mobile base station 100 per beacon. The factor γ is equal to the ratio of (interference power caused by a resource in a mobile base station 100 to a resource in another mobile base station 100) to (interference power caused by a resource in a mobile base station 100 to a resource in the same mobile base station 100) assuming equal received power levels per resource. That is, $\gamma^{-1}$ indicates how many foreign resources, or users, are equivalent to a native resource. This concept is based on the assumption that within each mobile base station 100 cell, there are local PN codes assigned to resources and then wrapped (or multiplied by) in a PN code specific to the mobile base station 100. Clearly, 0≦γ<<1.

For uplink, $\alpha_{l,U}^{i\to ij}$ may be computed by having $R_i$ listening to uplink bands using $R_{ij}$ PN code and measure the power levels on each band. These power levels are $I_{ij}^{l,U}$. Also, $R_i$ inquires the number of actual users on each band from $R_{ij}$, say $m_{l,ij}^U$ and computes the average power received at $R_i$ due to a user under $R_{ij}$ as $$P_{l,ij}^{av} = \frac{I_{ij}^{l,U}}{m_{l,ij}^U}.$$

For example, the mobile base station $R_i$ then normalizes $P^{l,ij,av}$ to the average power per user in its cell to get $\overline{P}_{l,ij}^{av}$ and then computes:

$$a_{l,U}^{i\to ij} = (\overline{P}_{l,ij}^{av})^{-1} \gamma^{-1} \left( \frac{a_{l,ij}^{U,real} - \mu_{l,ij}^U}{\sum_{j=1}^{J} a_{l,ij}^{U,real} - \mu_{l,ij}^U} \right) \cdot (a_{l,i}^{U,real} - \mu_{l,i}^U) \cdot \alpha_{l,i}^U.$$

It should be mentioned that the scaling of the amount of availability, $\alpha_{l,i}^{real}$, according to queue, or demand, sizes as well as availability is important in order to limit capacity of adjacent mobile base stations 100 in a fair way and at the same time leave some margin for $R_i$ to accommodate new resources with priority to $R_i$, since availability for $R_i$ is not scaled relative to demands or availability of other mobile base stations 100. The method of how adjacent mobile base stations 100 will make use of availability estimate sent to them by $R_i$ in order to account for $R_i$'s availability, or interference, limitations will be discussed next.

Considerate Resource Availability Table

Figure 14:
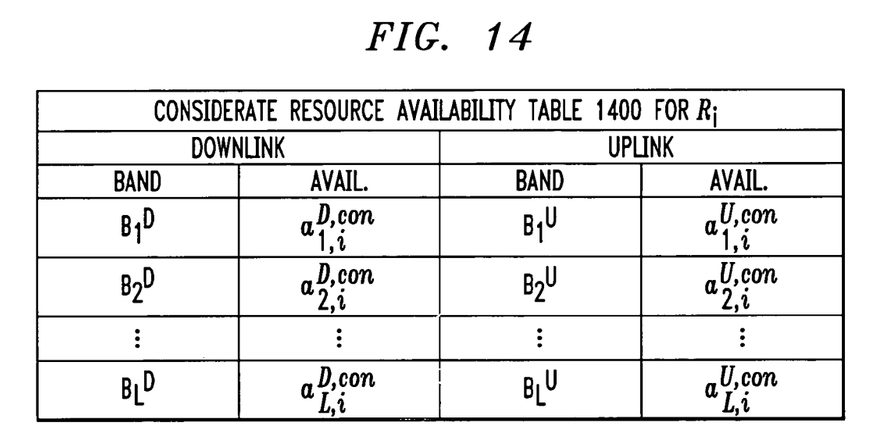
FIG. 14 is a sample table from an exemplary considerate availability table of FIG. 1.

Mobile base stations 100 collect estimates of availability tables from adjacent mobile base stations 100 and form a considerate availability table 1400, shown in FIG. 14. The considerate availability values shown in FIG. 14 are obtained as follows:

$$a_{l,i}^{D,con} = \min_{j=1,\dots,J}\{a_{l,D}^{ij\to i}\}, \text{ and } a_{l,i}^{U,con} = \min_{j=1,\dots,J}\{a_{l,U}^{ij\to i}\}.$$

Predicted Resource Availability Table

Figure 15:
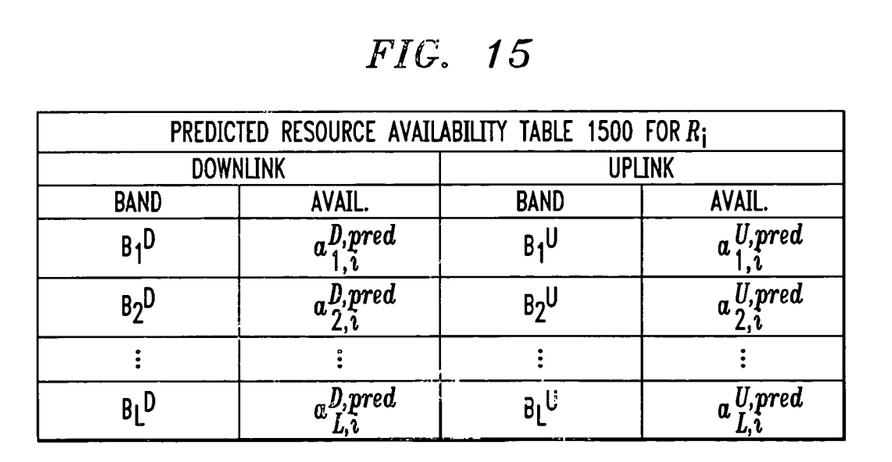
FIG. 15 is a sample table from an exemplary predicted resource availability table of FIG. 1.

A mobile base station $R_i$ forms and continuously updates the final availability table, referred to as the predicted resource availability table 1500, shown in FIG. 15. The predicted resource availability table 1500 is applied to the next new mobile request. The predicted resource availability values shown in FIG. 15 are obtained as follows:

$$a_{l,i}^{D,pred} = \min\{a_{l,i}^{D,con}, (a_{l,i}^{D,real} - \mu_{l,i}^D)\},$$

and $$a_{l,i}^{U,pred} = \min\{a_{l,i}^{U,con}, (a_{l,i}^{U,real} - \mu_{l,i}^U)\}.$$

Distributed Dynamic Channel Allocation Processes

New Mobile

Figure 16A:
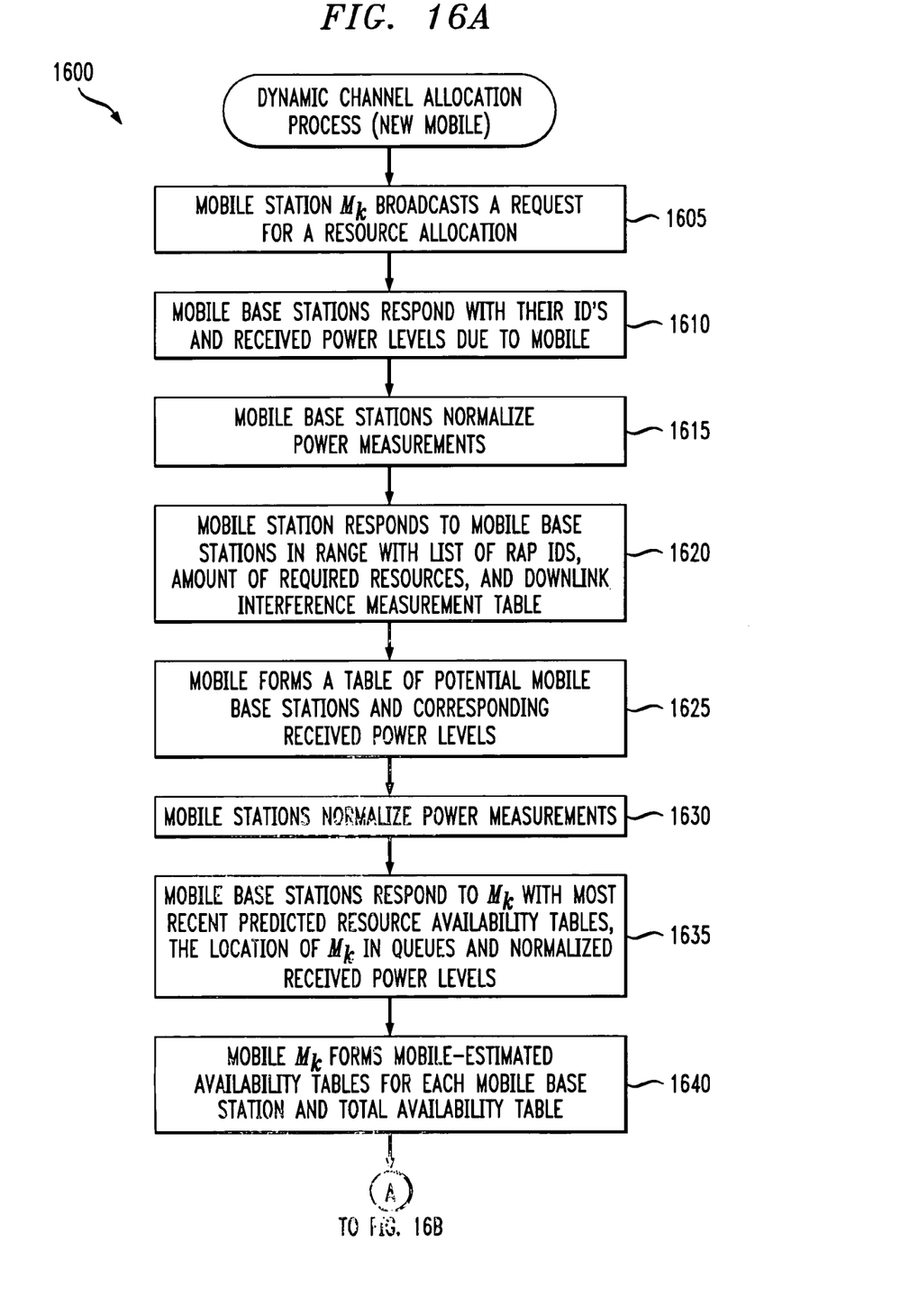
FIGS. 16A and 16B, collectively, are a flow chart describing an exemplary dynamic channel allocation process (new mobile) performed by the mobile base station of FIG. 1.
Figure 16B:
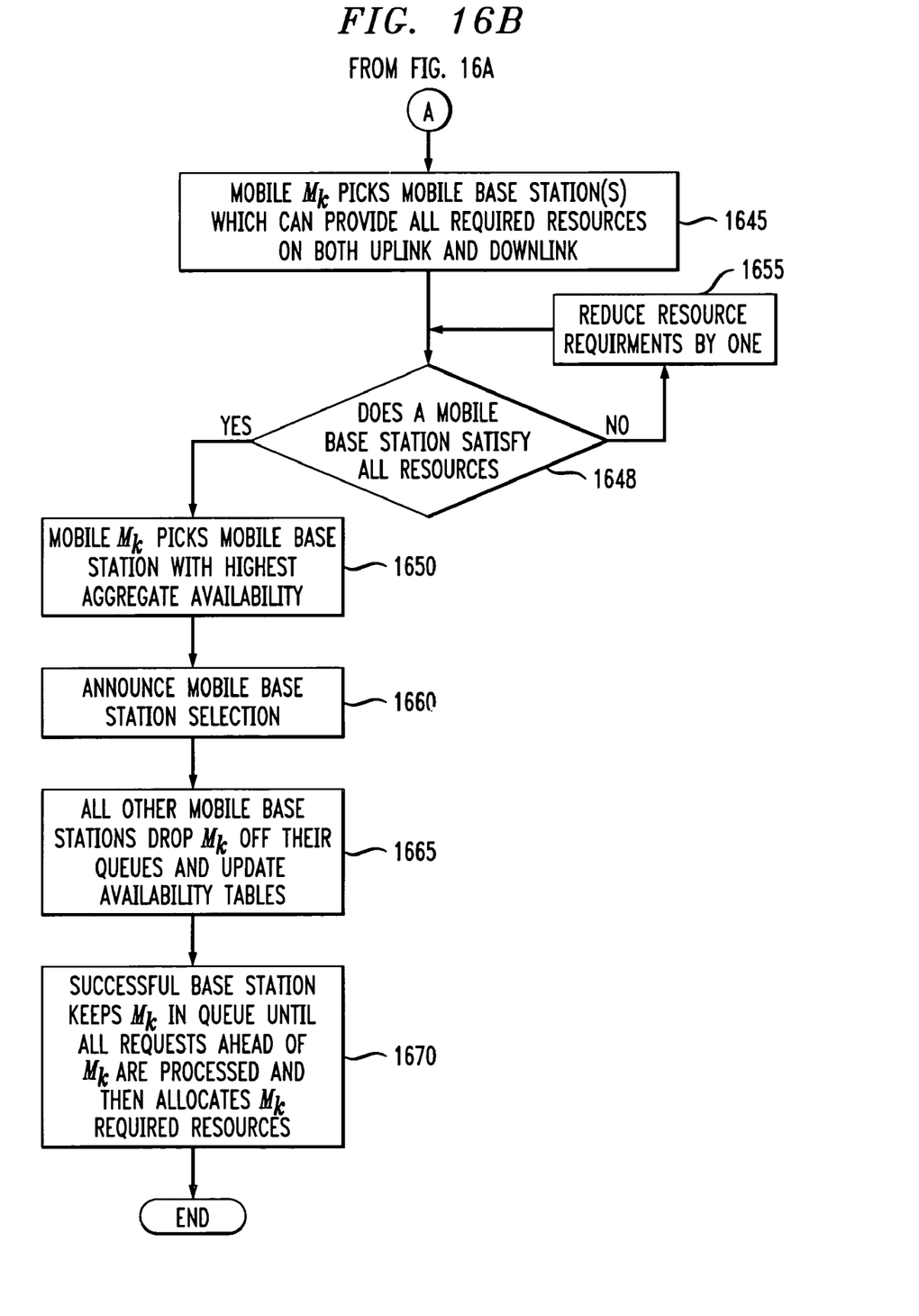

FIG. 16 is a flow chart describing an exemplary dynamic channel allocation process (new mobile) 1600. As shown in FIG. 16, the dynamic channel allocation process (new mobile) 1600 is initiated during step 1605 when a mobile station $M_k$ broadcasts a request for a resource allocation with $\lambda_k^U$ resources on uplink and $\lambda_k^D$ resources on downlink.

Thereafter, during step 1610, the mobile base stations 100 that can hear $M_k$ respond with their ID's and the received power levels at their antennas due to mobile, denoted $P_{M_k\to R_i}$. The mobile base stations 100 normalize the powers during step 1615 to some nominal value, which they are supposed to receive from a mobile's beacon in normal conditions. The normalized set of powers are then denoted $\overline{P}_{M_k\to R_i}$.

Figure 11:
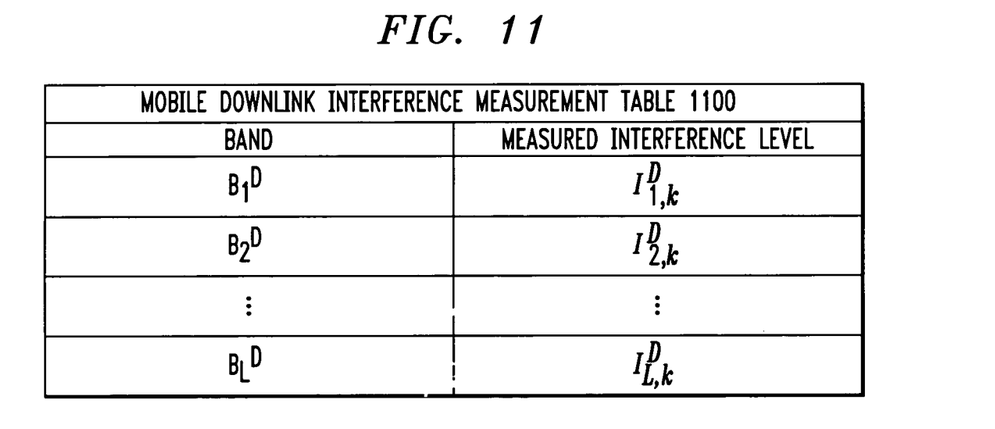
FIG. 11 is a sample table from an exemplary downlink interference measurement table of FIG. 1.

A mobile station only responds to mobile base stations 100 during step 1620 that are heard by the mobile station. Such response contains a list of RAP IDs for each mobile base station 100, such as $R_1, \dots, R_N$, the amount of required resources, such as $\lambda_k^U$ and $\lambda_k^D$, and the downlink interference measurement table 1100.

During step 1625, the mobile also forms a table of potential mobile base stations 100 and the corresponding received power levels at the mobile's antenna due to the mobile base stations 100, denoted $P_{R_i \to M_k}$. The mobile station normalizes the powers during step 1630 to some nominal value, which it is supposed to receive from a mobile base station 100 beacon in normal conditions. The normalized set of powers are then denoted $\overline{P}_{R_i \to M_k}$.

Only the mobile base stations 100 that find their IDs listed, such as $R_1, \ldots, R_N$, will consider the new request. All other mobile base stations 100 will ignore $M_k$'s request.

The mobile base stations 100 $R_1, \ldots, R_N$, use the downlink interference measurement table 1100 sent by $M_k$ as well as $\lambda_k^U$ and $\lambda_k^D$ for the next new mobile to appear, not for $M_k$. The mobile base stations 100 $R_1, \ldots, R_N$ respond to $M_k$ during step 1635 with their most recent predicted resource availability tables 1500 along with the location of $M_k$ in their queues. The mobile base stations 100 $R_1, \ldots R_N$ also send their normalized received power levels $\overline{P}_{M_k \to R_i}$.

Figure 17:
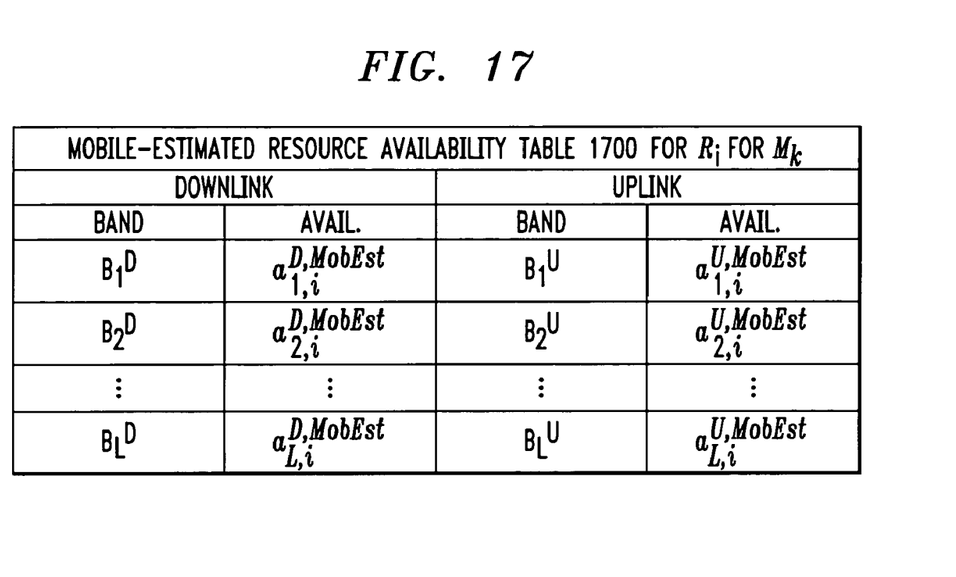
FIG. 17 is a sample table from an exemplary mobile-estimated availability tables of FIG. 1.

Mobile $M_k$ forms a set of mobile-estimated availability tables 1700, shown in FIG. 17, during step 1640 for each mobile base station 100 $R_1, \ldots, R_N$. For example, the mobile-estimated availability are obtained as follows:

$$a_{l,i}^{D,MobEst} = \overline{P}_{R_i \to M_k}\left(1 - \frac{I_{l,k}^D}{\sum_{l=1}^{L} I_{l,k}^D}\right) a_{l,i}^{D,pred}, \text{ and}$$

$$a_{l,i}^{U,MobEst} = \overline{P}_{M_k \to R_i} a_{l,i}^{U,pred}.$$

Figure 18:
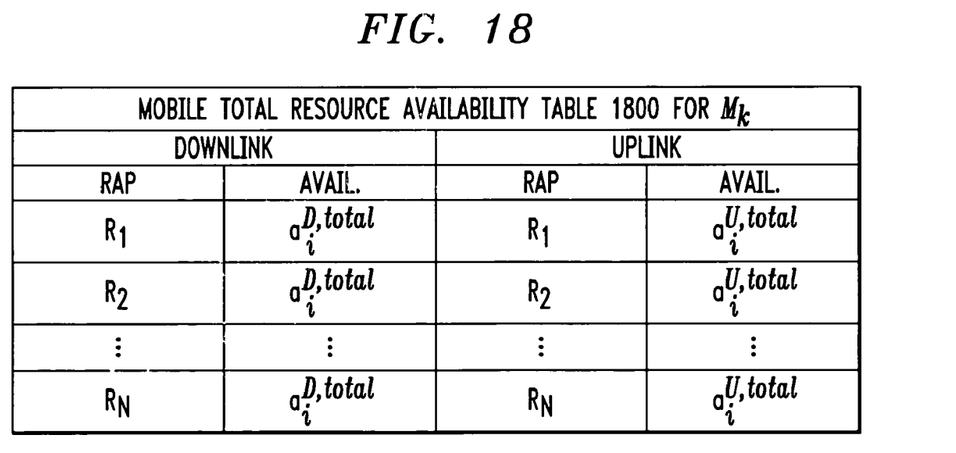
FIG. 18 is a sample table from an exemplary total availability table of FIG. 1.

Mobile $M_k$ then forms a total availability table 1800, shown in FIG. 18, where:

$$a_i^{D,total} = \sum_{l=1}^{L} a_{l,i}^{D,MobEst}, \text{ and } a_i^{U,total} = \sum_{l=1}^{L} a_{l,i}^{U,MobEst}.$$

Mobile $M_k$ picks the mobile base station(s) 100 during step 1645 that can provide all the required resources on both uplink and downlink, i.e., $\lambda_k^U$ and $\lambda_k^D$, respectively. Mobile $M_k$ then picks the mobile base station 100 with highest aggregate availability during step 1650, i.e., the mobile base station 100 with the highest $\alpha_j^{U,total} + \alpha_j^{D,total}$.

If $M_k$ can not find a mobile base station 100 that satisfies all the resources on one or both of directions, it either terminates the resource allocation procedure and announces that, or it may reduce the requirement by one during step 1655 and repeat the previous step. In an alternate implementation, mobile $M_k$ picks the mobile base station(s) during step 1645 in a manner that distributes the required resources over all mobile base stations 100 (filling more available first). In this manner, resources are distributed over several mobile base stations 100 for "diversity" gain. However, it is noted that the algorithm in this case is not as load balancing as the primary embodiment.

If the mobile $M_k$ denotes on a mobile base station(s) 100 during step 1650, it announces the mobile base station(s) 100 selection during step 1660. All other mobile base stations 100 drop $M_k$ off their queues and update availability tables accordingly during step 1665. The successful mobile base station(s) 100 keep(s) $M_k$ in its queue, as if $M_k$ did not decide yet, until all requests ahead of $M_k$ are processed and then it allocates $M_k$ the required resources and updates the tables during step 1670. If by the time $M_k$ is first in the queue, not enough resources are available (they have, been consumed by requests ahead of $M_k$), mobile $M_k$ may choose to accept a lesser amount of resources and may get a higher priority in terms of being allocated the remaining amount of resources in the future, or $M_k$ may choose to be rejected and program control will return to 1605 and continue in the manner described above. If $M_k$ decides on mobile base station(s) 100, the successful mobile base station(s) 100 allocate(s) $M_k$ the resources according to the corresponding entries in the mobile-estimated availability table 1700, i.e., $M_k$ informs the mobile base station(s) 100 of which resources go to which bands. This is done by filling bands with the largest availability first and so on.

Until mobile $M_k$ makes a decision, all concerned mobile base stations 100 wait for $M_k$ and cannot process requests which came after $M_k$. However, a mobile base station 100 cannot wait for $M_k$ more than the time it takes until $M_k$ is first in the queue. If a mobile base station 100 does not receive a decision from $M_k$ by that time, it drops $M_k$ off its queue and announces the removal and also updates the availability tables accordingly.

If $M_k$ is first in the queue of some mobile base station 100, such mobile base station 100 cannot wait for $M_k$'s decision more than a certain fixed amount of time. Thus, the mobile base stations 100 will not wait indefinitely for mobile stations.

Figure 19:
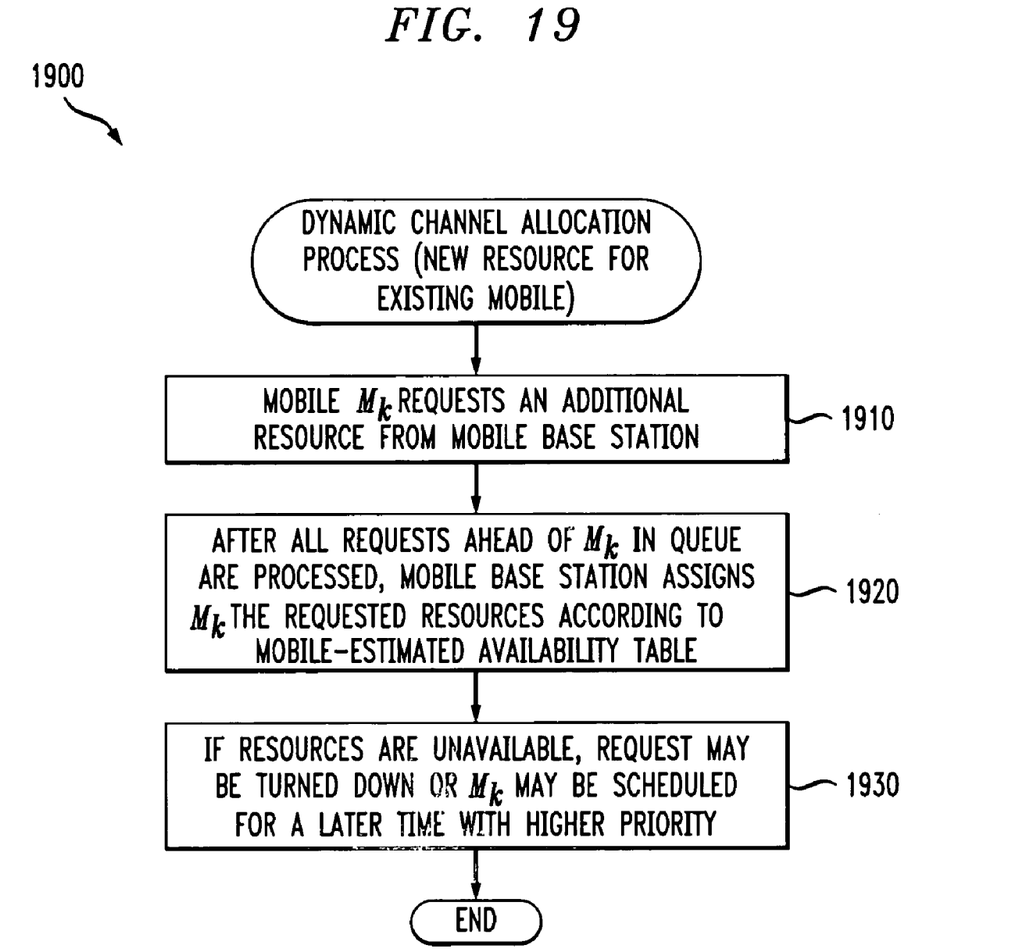
FIG. 19 is a flow chart describing an exemplary dynamic channel allocation process (new resource for existing mobile) performed by the mobile base station of FIG. 1.

FIG. 19 is a flow chart describing an exemplary dynamic channel allocation process (new resource for existing mobile) 1900. As shown in FIG. 19, the dynamic channel allocation process (new resource for existing mobile) 1900 is initiated during step 1910 when a mobile $M_k$ requests an additional resource from its mobile base station 100. The mobile base station 100 waits until all requests ahead of $M_k$ in the queue are processed. The mobile base station 100 then assigns $M_k$ the requested resources during step 1920 according to the mobile-estimated availability table 1700. It is noted that in this case the mobile $M_k$ only receives information from its mobile base station 100. That is, the mobile-estimated table 1700 consists of only two columns for uplink and downlink. If no resources are available, mobile $M_k$'s request may be turned down or $M_k$ may be scheduled for a later time with higher priority, for example, during step 1930.

If a mobile $M_k$, or its mobile base station 100 or both, decide that a handoff is needed, the mobile $M_k$ initiates the dynamic channel allocation process (new mobile) 1600. However, $M_k$ keeps the connection with its current mobile base station 100 until the mobile $M_k$ is assigned a new mobile base station 100.

It is to be understood that the embodiments and variations shown and described herein are merely illustrative of the principles of this invention and that various modifications may be implemented by those skilled in the art without departing from the scope and spirit of the invention. For example, the algorithm presented here can also be adjusted to apply to TDMA/CDMA systems, as would be apparent to a person of ordinary skill in the art.

I claim:

1. A method for allocating a resource to a mobile station in a wireless communications network having at least one mobile base station, said method comprising the steps of:

collecting measurements of interference and load in said wireless communications network, wherein said collected measurements include expected resource availability information and measured resource availability information;
processing said collected information to identify a resource for said mobile station; and
assigning said resource to said mobile station.

2. The method of claim 1, wherein said measurements are collected from both said mobile station and said base stations.

3. The method of claim 1, wherein said expected resource availability information provides a measure of the load on said wireless communications network.

4. The method of claim 1, wherein said measured resource availability information provides a measure of the interference on said wireless communications network.

5. The method of claim 1, wherein said expected resource availability is an expected capacity value for each band on said network less the number of users on said band.

6. A method for allocating a resource to a mobile station in a wireless communications network having a plurality of base stations including at least one mobile base station, said method comprising the steps of:
collecting measurements of interference and load in said wireless communications networks, wherein said collected measurements include received power measurements from neighboring base stations;
processing said collected information to identify a resource for said mobile station; and
assigning said resource to said mobile station.

7. The method of claim 6, wherein said power measurements are received from said neighboring base stations on a beacon channel.

8. The method of claim 6, wherein said received power measurements provide an indication of the distance to a neighboring base station.

9. The method of claim 6, wherein said measurements are collected from both said mobile station and said base stations.

10. A method for allocating a resource to a mobile station in a wireless communications network having a plurality of base stations including at least one mobile base station, said method comprising the steps of:
collecting measurements of interference and load in said wireless communications network, wherein said collected measurements include predicted new load information;
processing said collected information to identify a resource for said mobile station; and
assigning said resource to said mobile station.

11. The method of claim 10, wherein said predicted new load, $\mu_{li}^D$, is computed as follows:

$$\mu_{li}^D = p_{li}^D \sum_{k=1}^{K} \lambda_k^D,$$

where $p_{l,i}^D$ is a probability of assigning a resource to a band and $\lambda_k^D$ are a number of users over a downlink band.

12. A method for allocating a resource to a mobile station in a wireless communications network having a plurality of base stations including at least one mobile base station, said method comprising the steps of:
collecting measurements of interference and load in said wireless communications network;
processing said collected information to identify a resource for said mobile station such that said resource allocation minimizes a call drop rate; and
assigning said resource to said mobile station.

13. The method of claim 12, wherein said call drop rate ensures that a resource will not be assigned to said mobile station if a likelihood that allocating said resource to said mobile station will cause another mobile station to be dropped exceeds a predefined threshold.

14. A system for allocating a resource to a mobile station in a wireless communications network having at least one mobile base station, said system comprising:
a memory for storing computer readable code; and
a processor operatively coupled to said memory, said processor configured to:
collect measurements of interference and load in said wireless communications network, wherein said collected measurements include nominal resource availability information and measured resource availability information;
process said collected information to identify a resource for said mobile station; and
assign said resource to said mobile station.

15. The system of claim 14, wherein said measurements are collected from both said mobile station and said base stations.

16. The system of claim 14, wherein said nominal resource availability information provides a measure of the load on said wireless communications network.

17. The system of claim 14, wherein said measured resource availability information provides a measure of the interference on said wireless communications network.

18. The system of claim 14, wherein said nominal resource availability is a nominal capacity value for each band on said network less the number of users on said band.

19. A system for allocating a resource to a mobile station in a wireless communications network having a plurality of base stations including at least one mobile base station, said system comprising:
a memory for storing computer readable code; and
a processor operatively coupled to said memory, said processor configured to:
collect measurements of interference and load in said wireless communications network, wherein said collected measurements include received power measurements from neighboring base stations;
process said collected information to identify a resource for said mobile station; and
assign said resource to said mobile station.

20. The system of claim 19, wherein said power measurements are received from said neighboring base stations on a beacon channel.

21. The system of claim 19, wherein said received power measurements provide an indication of the distance to a neighboring base station.

22. The system of claim 19, wherein said measurements are collected from both said mobile station and said base stations.

23. A system for allocating a resource to a mobile station in a wireless communications network having a plurality of base stations including at least one mobile base station, said system comprising:
a memory for storing computer readable code; and
a processor operatively coupled to said memory, said processor configured to:

collect measurements of interference and load in said wireless communications network, wherein said collected measurements include predicted new load information;

process said collected information to identify a resource for said mobile station; and assign said resource to said mobile station.

24. The system of claim 23, wherein said predicted new load, $\mu_{li}^D$, is computed as follows:

$$\mu_{li}^D = p_{l,i}^D \sum_{k=1}^{K} \lambda_k^D,$$

where $p_{l,i}^D$ is a probability of assigning a resource to a band and $\lambda_k^D$ are a number of users over a downlink band.

25. A system for allocating a resource to a mobile station in a wireless communications network having a plurality of base stations including at least one mobile base station, said system comprising:

collecting measurements of interference and load in said wireless communications network;

processing said collected information to identify a resource for said mobile station such that said resource allocation minimizes a call drop rate; and assigning said resource to said mobile station.

26. The system of claim 25, wherein said call drop rate ensures that a resource will not be assigned to said mobile station if a likelihood that allocating said resource to said mobile station will cause another mobile station to be dropped exceeds a predefined threshold.

* * * * *

UNITED STATES PATENT AND TRADEMARK OFFICE
CERTIFICATE OF CORRECTION

PATENT NO.         : 7,373,151 B1
APPLICATION NO.    : 09/379675
DATED              : May 13, 2008
INVENTOR(S)        : Ahmed It is certified that error appears in the above-identified patent and that said Letters Patent is hereby corrected as shown below:

In the specification, column 4, line 49, after "RAP" and before "assumes" replace "Ri" with --$R_i$--.

Column 5, line 13, after "concern" and before "P" replace "by" with --be--.

Column 6, line 15, after "value" and before "," replace "$Qi_{max}^D$ or $Qi_{max}^U$" with -- $Q_{i_{max}}^D$ or $Q_{i_{max}}^U$ --.

Column 7, line 38, after "(" and before "-" replace "$\alpha_{l,j}^{D,real}$" with -- $a_{l,i}^{D,real}$ --; line 40, after "if" and before "-" replace "$\alpha_{l,ij}^{D,real}$" with -- $a_{l,ij}^{D,real}$ --.

Column 8, line 2, before "to" replace "$p^{l,ij^{av}}$" with -- $P_{l,ij}^{av}$ --; line 41, that portion of the formula reading "$a_{l,i}^{D,com}$" should read -- $a_{l,i}^{D,con}$ --; line 44, that portion of the formula reading "$a_{l,i}^{U,com}$" should read -- $a_{l,i}^{U,con}$ --.

Column 9, lines 53-54, after "station(s)" and before "during" insert --100--; line 60, after "$M_k$" and before "on" replace "denotes" with --decides--.

In claim 11, column 11, lines 56-57, that portion of the formula reading "$\mu_{li}^D = p_{li}^D$" should read -- $\mu_{l,i}^D = p_{l,i}^D$ --.

UNITED STATES PATENT AND TRADEMARK OFFICE
CERTIFICATE OF CORRECTION

PATENT NO.         : 7,373,151 B1
APPLICATION NO.    : 09/379675
DATED              : May 13, 2008
INVENTOR(S)        : Ahmed It is certified that error appears in the above-identified patent and that said Letters Patent is hereby corrected as shown below:

In claim 24, column 13, line 9, after "load," and before ", is" replace " $\mu_{li}^{D}$ " with -- $\mu_{l,i}^{D}$ --; lines 12-13, that portion of the formula reading " $\mu_{li}^{D} = p_{li}^{D}$ " should read -- $\mu_{l,i}^{D} = p_{l,i}^{D}$ --.

Signed and Sealed this

Twenty-first Day of October, 2008

JON W. DUDAS
*Director of the United States Patent and Trademark Office*